US005555439A

United States Patent [19]

Higashino et al.

[11] Patent Number: 5,555,439
[45] Date of Patent: Sep. 10, 1996

[54] LEARNING SYSTEM AND A LEARNING PATTERN SHOWING METHOD FOR A NEURAL NETWORK

[75] Inventors: Junichi Higashino, Kodaira; Kazuhiko Kawasaki; Miyuki Hara, both of Yokohama, all of Japan

[73] Assignees: Hitachi, Ltd.; Hitachi Seibu Soft Ware Co., Ltd., both of Tokyo, Japan

[21] Appl. No.: 895,928

[22] Filed: Jun. 9, 1992

[30] Foreign Application Priority Data

Jun. 12, 1991 [JP] Japan .................................... 3-139982

[51] Int. Cl.⁶ .................................................. G06F 15/18
[52] U.S. Cl. .............................. 395/23; 395/22; 395/24
[58] Field of Search ................................. 395/23, 22, 24

[56] References Cited

U.S. PATENT DOCUMENTS

| | | |
|---|---|---|
| 3,638,196 | 1/1972 | Nishiyama ................................ 395/24 |
| 5,052,043 | 9/1991 | Goborski .................................. 395/22 |
| 5,056,037 | 10/1991 | Eberhardt ................................ 395/23 |
| 5,091,965 | 2/1992 | Kobayashi et al. ...................... 395/22 |
| 5,093,899 | 3/1992 | Hiraiwa ................................... 395/23 |
| 5,107,454 | 4/1992 | Niki ......................................... 395/24 |
| 5,129,038 | 7/1992 | Konda et al. ............................ 395/23 |
| 5,142,612 | 8/1992 | Skeirik .................................... 395/23 |
| 5,142,666 | 8/1992 | Yoshizawa et al. ..................... 395/24 |
| 5,185,816 | 2/1993 | Takatori et al. ......................... 395/23 |
| 5,272,723 | 12/1993 | Kimoto et al. ..................... 364/724.19 |
| 5,297,237 | 3/1994 | Masuoka et al. ........................ 395/23 |
| 5,353,207 | 10/1994 | Keeler et al. ........................... 364/164 |
| 5,396,565 | 3/1995 | Asogawa ................................. 395/23 |

FOREIGN PATENT DOCUMENTS

| | | |
|---|---|---|
| 8920213 | 8/1989 | European Pat. Off. . |
| 1-320565 | 7/1988 | Japan . |
| 2-220169 | 5/1989 | Japan . |
| 2-219167 | 5/1989 | Japan . |
| 2-235170 | 7/1989 | Japan . |
| 3296880 | 12/1991 | Japan ..................................... 395/23 |

OTHER PUBLICATIONS

Wasserman et al, "Neural Network, Part 2:" IEEE Expert, 1988.
Salam et al, "A New Feedback Neural Network With Supervised Learning", IEEE, Jan. 1991.
Huang et al, "Learning Algorithms For Perceptions Using Back–Propagation With Selective Updates", IEEE Control System Magazine, Apr. 30, 1990.
Hanson et al, "Comparing Biases For Minimal Network Construction With Back–Progagation", Dec. 1989.
Rumelhart, D. E., et al. *Parallel Distributed Processing: Explorations in the Microstructure of Cognition*, vol. 1: Foundations, Chapter 8 "Learning Internal Representations by Error Propagation," The MIT Press, Cambridge, Mass., 1986, pp. 318–362. (Provided in English).

*Primary Examiner*—George B. Davis
*Attorney, Agent, or Firm*—Fay, Sharpe, Beall, Fagan, Minnich & McKee

[57] ABSTRACT

A neural network learning system using back propagation and a method of learning pattern showing are disclosed. In the case where a supervised signal contains an error or a pattern difficult to learn, the error is detected and the particular pattern is automatically removed during calculations of learning iterations to conduct rightly and accelerate the learning. The learning history for each pattern is stored to detect inconsistent and difficult-to-learn patterns, which are prevented from being shown to the network by a pattern showing control during the next learning iteration. As a result, an inconsistent or difficult-to-learn pattern which may be contained in a learning pattern set of input and supervised patterns is removed during learning iterations thereby to permit early completion of the learning process.

13 Claims, 16 Drawing Sheets

| PATTERN No. | INPUT NODE 1 | INPUT NODE 2 | OUTPUT NODE 1 |
|---|---|---|---|
| 1 | 0.0 | 0.0 | 0.0 |
| 2 | 0.0 | 1.0 | 1.0 |
| 3 | 1.0 | 0.0 | 1.0 |
| 4 | 1.0 | 1.0 | 0.0 |
| 5 | 0.0 | 0.0 | 1.0 |
| 6 | 0.0 | 0.01 | 1.0 |
| 7 | 0.0 | 0.05 | 1.0 |
| 8 | 0.0 | 0.1 | 1.0 |

FIG. 9

| PATTERN COMBINATION / PATTERN No. | 1<br>1,2,3,4<br>(XOR) | | 2<br>1,2,3,4,5<br>(INCONSISTENT) | | 3<br>1,2,3,4,6<br>(1 AND APPROXIMATE) | | 4<br>1,2,3,4,7<br>(1 AND APPROXIMATE) | | 5<br>1,2,3,4,8<br>(1 AND APPROXIMATE) | |
|---|---|---|---|---|---|---|---|---|---|---|
| 1 | 17 | ○ | 2,468 | × | 2,317 | × | 110 | ○ | 54 | ○ |
| 2 | 20 | ○ | 23 | ○ | 19 | ○ | 17 | ○ | 23 | ○ |
| 3 | 23 | ○ | 22 | ○ | 29 | ○ | 17 | ○ | 22 | ○ |
| 4 | 22 | ○ | 21 | ○ | 37 | ○ | 33 | ○ | 21 | ○ |
| 5 | | | 2,468 | × | 2,302 | × | | | | |
| 6 | | | | | | | | | | |
| 7 | | | | | | | 104 | ○ | | |
| 8 | | | | | | | | | 54 | ○ |

REMARK: No. OF BPs / ○ CONVERGED / × NOT CONVERGED

| PATTERN No. | PRIORITY FLAG | No. OF BPs | REMOVAL FLAG |
|---|---|---|---|
| 1 | 1 | 15 | 0 |
| 2 | 0 | 20 | 0 |
| 3 | 1 | 62 | 0 |
| 4 | 0 | 60 | 1 |
| | | | |
| P | 1 | 22 | 0 |

| HISTOGRAM No. | No. OF BPs | No. OF PATTERNS |
|---|---|---|
| 1 | 0 ~ 10 | 985 |
| 2 | 10 ~ 20 | 158 |
| 3 | 20 ~ 30 | 97 |
| 4 | 30 ~ 40 | 87 |
| 5 | 40 ~ 50 | 33 |
| 6 | 50 ~ 60 | 10 |
| 7 | 60 ~ 70 | 4 |
| 8 | 70 ~ 80 | 4 |
| 9 | 80 ~ 90 | 1 |
| 10 | 90 ~ 100 | 3 |

LEARNING SYSTEM AND A LEARNING PATTERN SHOWING METHOD FOR A NEURAL NETWORK

BACKGROUND OF THE INVENTION

The present invention relates to a learning system for a neural network for pattern recognition, or more in particular to a learning pattern showing method for a neural network.

Technological fields in which the pattern recognition techniques are often used include voice recognition, character recognition, image recognition and drawing recognition. A conventionally-used method of statistical discrimination development of a method for calculating a feature value is required for discrimination. An improved discrimination rate based on superior discrimination of features like personal characteristics is necessary especially in voice and character recognitions. When the object of discrimination undergoes a change, however, it is not an easy matter to change the method of discrimination and the data for discrimination such as the feature dictionaries. A neural network, which utilizes a learning function, not only eliminates the need of development of a discrimination method but also makes it possible to equip the system with an adaptive discrimination ability.

The neural network uses the learning with a back propagation, as will be described. In a learning algorithm using a back propagation, which represents a supervised learning, it is necessary to prepare a value to be outputted by a neural network as a supervised pattern against an input pattern. An output value is produced through a neural network in response to an input pattern, and this output value is compared with the value of the supervised pattern corresponding to the input pattern. If the resulting error is larger than a reference, it is decided that convergence criteria are not satisfied and the weights of the neural network are updated to effect proper learning.

The learning using a back propagation poses the problems of a long calculation time for learning and local minima leading to a delayed learning. More specifically, the back propagation is based on an optimization method, or what is called the "mountain climbing" in the method of operations research, and therefore a right optimum point cannot be found unless the step size of the iterative calculation or moment value is set properly. In view of this, a "Method of Improving the Neural Network Learning Efficiency" disclosed in JP-A-01-320565 is intended to obviate the problems of pattern recognition including character and voice recognitions which occur at the time of learning of a neural network. This method consists in changing the step size and moment value in the process of iterative calculations of learning and thereby correctly proceeding with the iterative calculations of learning.

The method of proceeding with the learning depends on the method of selecting parameters such as step size and moment in the optimization on the one hand and the characteristics of the pattern for learning on the other hand. A method has been disclosed in which a pattern is divided into several groups in advance and the learning is effected separately for each group, followed by an overall learning to improve the speed. (JP-A-02-219167).

In the back propagation, a plurality of patterns are learned iteratively, and therefore different pattern learnings have different rates of progress. Generally, in the latter half of learning, a multiplicity of learning patterns have already gone through the learning in many cases. In view of this, a method is disclosed in which the weights are not corrected for patterns completed in learning thereby to shorten the calculation time as a whole. (JP-A-02-220169).

One cause of a long calculation time required and failure of correct calculation in the back propagation learning lies in the fact that it sometimes occurs that very similar patterns in a pattern set to be learned are classified into quite different categories, or totally different patterns are classified into the same category. The back propagation, which is called "the supervised learning", requires a correct supervised signal. The supervised signal is for determining which category a pattern belongs to and is ordinarily assigned by a human being, who may prepare a wrong supervised signal. If a supervised signal is erroneous, the learning calculation for back propagation is repeated more times than needed, and in some cases, indefinitely along a loop. Increased calculations occur when an input pattern does not contain a sufficient amount of information as well as when a supervised signal contains inconsistent information. In other words, a lack of information makes classification impossible. Due to this characteristic of back propagation, a method of excluding exceptional patterns in advance is disclosed by JP-A-02-235170. According to this method, only an effective pattern for learning is selected in advance by a statistical technique. An "effective pattern" is one belonging to the boundary between different patterns. A pattern located in the central part of a pattern is stated to protract the learning pattern or a pattern that has entered a category region lengthens unnecessarily the learning time thereby to reduce the classification performance for patterns other than a learning sample. Nevertheless, no consideration is made about a method of detecting and removing exceptional patterns during the learning.

In the case where back propagation is used as a learning method for a neural network, the learning pattern requiring discrimination is repeated and shown to the network a number of times to update the weights. In the conventional method in which a learning pattern is shown a number of times in similar fashion, the failure to end the learning calculation is posed as a problem if the supervised signal of the learning pattern is erroneous and contains an inconsistent pattern. Also, there may be a learning pattern which is not erroneous but very difficult to discriminate. In such a case, the learning calculation may end but require a very long length of time.

SUMMARY OF THE INVENTION

The object of the present invention is to detect an error and eliminate a related pattern automatically in the process of iterative learning calculations thereby to correctly proceed with and improve the speed of a learning of a neural network which is effected by use of a back propagation and in which a supervised signal contains a pattern difficult to learn.

In order to achieve the above-mentioned object, according to the present invention, there is provided a learning system and a learning pattern showing method for a neural network, comprising a learning history memory for storing the learning history of each pattern to detect inconsistent and difficult-to-learn patterns, and a pattern showing control section for preventing detected inconsistent or difficult-to-learn patterns from being shown to the network in the next cycle of learning.

In the back propagation learning, the weights are updated on the basis of an error between a supervised signal and an output until a value substantially equal to the supervised signal is outputted (converged). The error histories of patterns prepared for learning are generally different from each other. The weights can be updated in a small number of times for some patterns, while a greater number of iterations may be required for other patterns. Before all learning patterns are converged, convergence conditions for a given pattern which has already converged may come to fail to be satisfied after the weights of another unconverted pattern is updated. As a result, even the outputs of patterns already converged must be checked iteratively to decide whether or not the learning is required.

It is possible to estimate the degree to which the learning of a given pattern is easy or difficult by storing the learning history based on the weights updating for each pattern. Depending on the characteristics of the calculation method for the learning, the number of times of learning for inconsistent patterns described above generally is greater than that for consistent patterns. In the course of learning, the updatings of weights for inconsistent and difficult-to-learn patterns compete with each other. More specifically, even when a pattern (A) of a plurality of competing ones (called A and B) is converged, the other pattern (B) which has already converged may come to fail to satisfy the convergence conditions due to a change in the network conditions. As a result, the weights are updated again for the pattern B, which in turn may cause the pattern A to come to fail to satisfy the convergence conditions.

Detection of inconsistent patterns is thus made possible by providing means for storing the difference in the number of times of learning and the learning history. Further, a pattern showing control section makes it possible to regard a given pattern as inconsistent according to a criterion based on the number of times of learning or history information and prevent it from showing from the next learning, thereby eliminating inconsistent patterns.

BRIEF DESCRIPTION OF THE DRAWINGS

FIG. 9 is a diagram showing the number of learning iterations for explaining the effect of a difficult-to-learn pattern.

DESCRIPTION OF THE PREFERRED EMBODIMENTS

Figure 1:
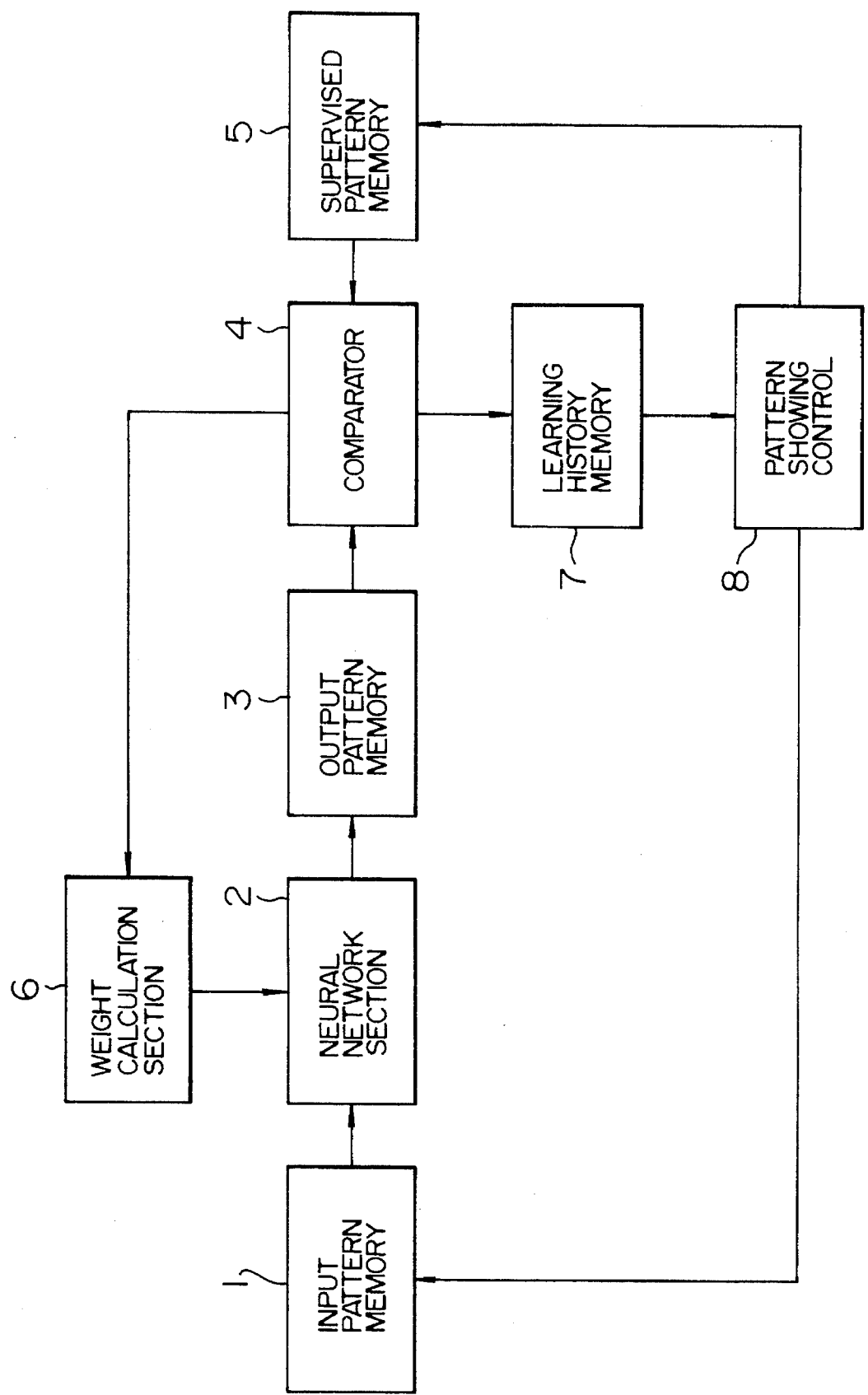
FIG. 1 is a diagram showing a system configuration for realizing a method of learning pattern showing according to the present invention.

An embodiment of the present invention will be described with reference to the accompanying drawings. A general configuration of a learning system for realizing a method of learning pattern showing according to the present invention is illustrated in FIG. 1. In the case of the back propagation learning algorithm representing a supervised learning, a value to be outputted by a neural network against an input pattern is required to be prepared as a supervised pattern. The input pattern and the supervised pattern are stored respectively in an input pattern memory section 1 and a supervised pattern memory section 5. The neural network section 2 which is a multilayer network has an output pattern memory section 3 for storing an output value calculated through the network from an input pattern.

The neural network section, though not shown, includes an input layer having means for inputting a plurality of patterns, a hidden layer having at least one data processing means, and an output layer having a plurality of data processing means with a pattern output means. Each data processing means is connected to a plurality of data processing means belonging to a lower layer nearer to the input layer, and includes memory means for storing a weight corresponding to each connection, and is configured to effect the sum-of-products calculation from the output value of the lower layer and the weight, and outputs the calculated value to a plurality of data processing means belonging to a lower layer nearer to the output layer. The neural network section makes up a multilayer neural network in which when a given input pattern is inputted from the input layer among a plurality of input-output pattern sets, the weights of the data processing means are repeatedly adjusted until patterns substantially equal to the output patterns corresponding to all input patterns are outputted from the output layer.

The output value of the neural network section 2 is stored in the output pattern memory section 3. The value of a supervised pattern corresponding to the input pattern stored in the supervised pattern memory section 5 is compared with the output pattern value from the output pattern memory section 3 at a comparator section 4. When the error is larger than a reference, it is decided that convergence conditions fail to be met, and the weight of the neural network section 2 is updated at a weight processing section 6. The method of calculating the amount of weight updating is described in detail in Rumelhart, D. E., Hinton, G. E., Willianms, R. J.,: Parallel Distributed Processing: Explorations in the Microstructure of Cognition. Volume 1: Foundations, Chapter 8, The MIT Press, Cambridge, Mass. (1986).

Component elements characteristic of the present invention include a learning history memory section 7 and a pattern showing control section 8. The learning history memory section 7 has stored therein the result of comparison at the comparator section 4 of all the learning patterns (sets of input and supervised patterns). The pattern showing control section 8, on the other hand, decides whether the learning should be continued or not from the number of learning iterations and the pattern learning history, and stores the result of decision in the input memory section 1 and the supervised pattern memory section 5. If the decision is to omit the pattern showing at the time of learning, it follows that the particular learning pattern is removed.

Figure 2:
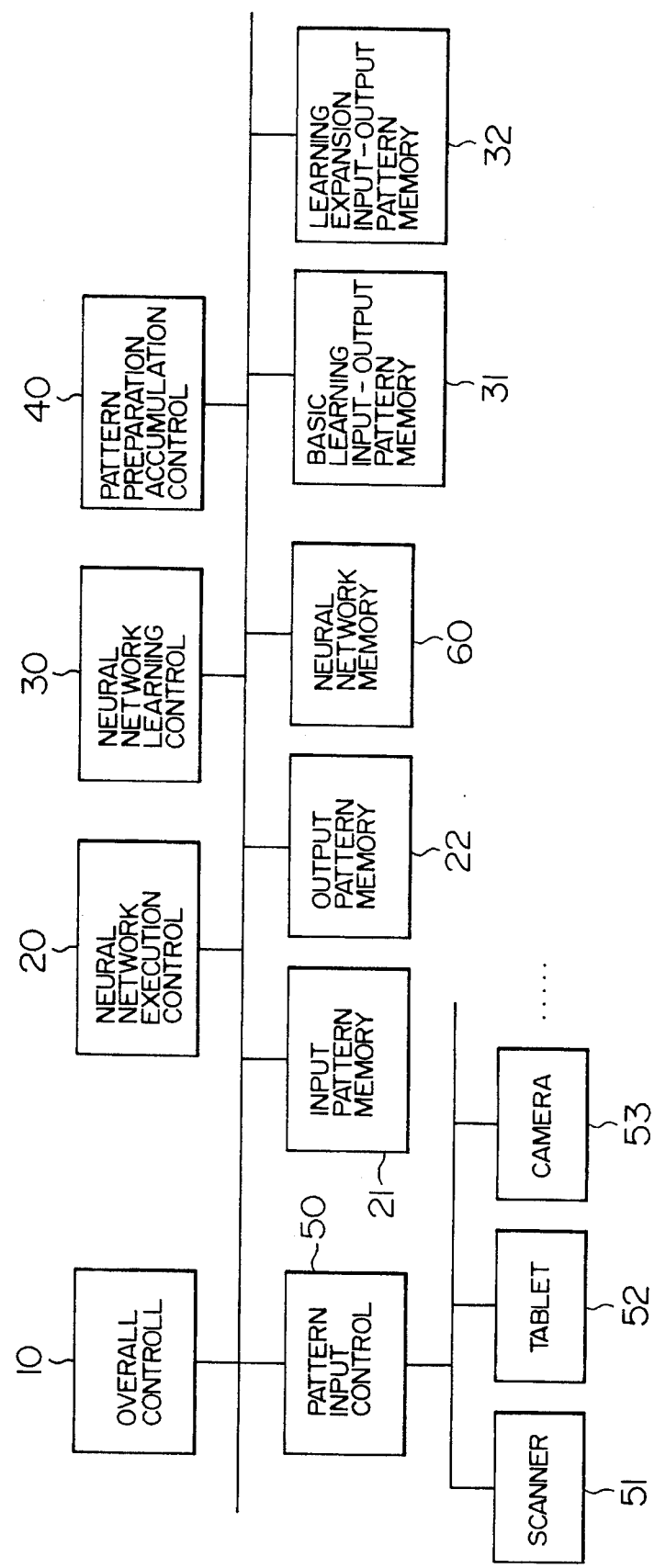
FIG. 2 is a diagram showing a general configuration of a learning system utilizing a learning pattern showing method for a neural network.

FIG. 2 shows an example of configuration of a learning system as adapted to a specific system using the learning pattern showing method described with reference to FIG. 1.

The present invention, which relates to a learning method for a neural network for pattern discrimination, is used for recognition of voices, characters, images and drawings. Explanation that follows will deal with a case in which an object of recognition changes such as in character recognition. In the recognition of hand-written characters, the penmanship or style of handwriting is different from one user to another, and therefore a prepared dictionary for recognition is desirably corrected for each user. Also, the same user may often write differently in accordance with his or her degree of mastery. It is desirable, therefore, that the dictionary can be readily updated throughout the whole period of system operation.

In FIG. 2, the whole system is controlled by a general control section 10. Input characters are read and converted from patterns into codes. This function is substantially equivalent to the input from a keyboard or a pointing device like a mouse. Generally, input devices include a scanner 51 for optically inputting printed or handwritten characters as an image, a tablet 52 with input-output display using a special pen, and a camera 53 suitable for input of books or the like. The scanner 51 is intended for use with printed or handwritten characters on the paper. In the case of printed characters, the type of character fonts or character size used in the dictionary may differ from those which the user intends to read. Also, the characters may have a blur specific to a particular printer of the user. Further, different users have different handwriting styles. If it is possible to register the penmanship of each user with the dictionary, the recognition rate may be effectively improved. In such a case, in addition to a prepared dictionary, a dictionary specific to a particular user could be recompiled. The tablet 52, which is used as an input unit for a small-sized computer, realizes an easier-to-input method or dictionary updating for an improved recognition rate in accordance with the penchants or personal characteristics of the user. The camera 53 is sometimes used when input operation with the scanner is difficult. Generally, the input image quality depends on environmental light sources and requires an adaptive updating of a prepared dictionary.

The input devices described above are controlled by a pattern input control section 50. A pattern that has been inputted is stored in an input pattern memory 21. In the case where a dictionary that has already completed the learning exists or dictionary update is complete, recognition as to which code an input pattern corresponds to is controlled by a neural network execution control section 20. A neural network section 60 outputs the recognition result to the pattern memory 22. This result is referenced by the general control section 10.

The execution of learning or dictionary update is controlled by a neural network learning section 30. A standard pattern is stored in a basic learning input-output pattern memory 31. Input-output patterns mean a set of several input patterns accumulated in the pattern input control section 50 and the recognition result thereof. These patterns are not only input patterns from the pattern input control section 50 but also include patterns collected by other devices in advance. Further, patterns prepared by the user for dictionary update are stored in a learning expansion input-output pattern memory 32.

A pattern preparation accumulation control section 40 prepares a pattern necessary for learning of a neural network from the memory unit 31 or 32 accumulating learning patterns, and stores them in the memories 21 and 22. In order to accumulate learning patterns, on the other hand, the pattern preparation accumulation control section 40 inputs patterns from the pattern input control section 50. In the process, patterns specific to the user are controlled to be accumulated in the expansion input-output pattern memory 32 by the general control section 10.

Referring to FIG. 1, the input pattern memory 1 corresponds to the means 21 in FIG. 2, the neural network section 2 to the means 60 in FIG. 2, and the output pattern memory 3 to the means 22 in FIG. 2. The supervised pattern memory 5 in FIG. 1 corresponds to the section for storing output patterns in the basic learning input-output pattern memory 31 or the learning expansion pattern memory 32. Output patterns stored in these memories are used as supervised patterns at the time of learning. The weight processing section 6, the learning history memory 7 and the pattern showing control section 8 in FIG. 1 may be considered to be included in the neural network learning control section 30 in FIG. 2.

For determining the features of the present invention, a method of pattern showing generally used in the prior art will be described more in detail.

Figure 3:
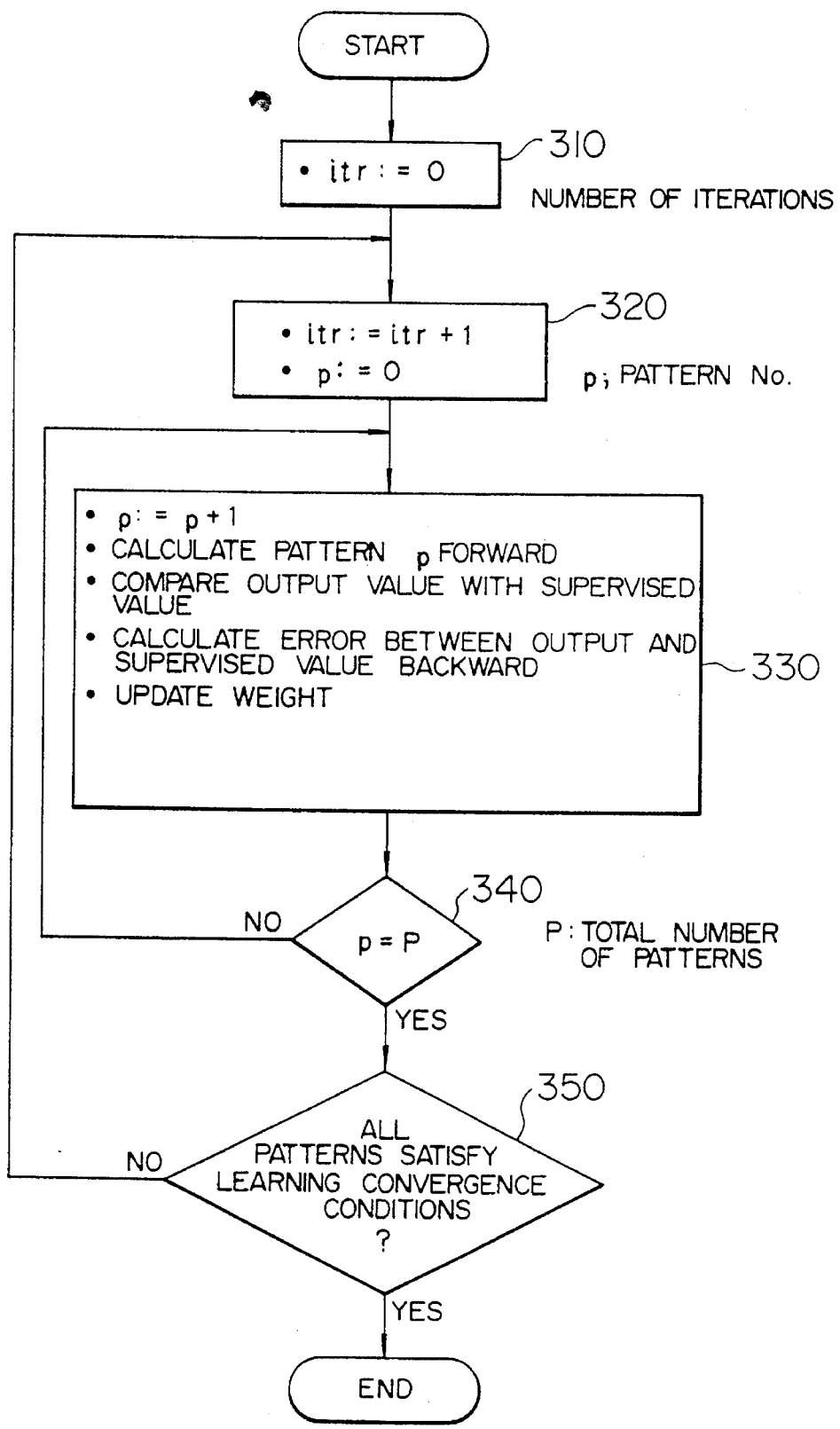
FIG. 3 is a diagram showing an example of a first learning method lacking a pattern showing control section.

An example of a first learning method lacking the control of a generally-used pattern showing section or a learning method is shown in FIG. 3. The first learning method consists in correcting the weights from the errors in all the learnings. Block 310 initializes the number of learning iterations "itr", and block 320 increases the number of learning iterations while at the same time initializing the pattern number p to be shown to zero. Block 330 effects forward calculation for a neural network, compares an output value with a supervised value, calculates an error backward, and updates the weights of the neural network with regard to the pattern of number p. Block 340 decides whether the pattern number for which calculation has just been completed is of the last pattern stored in the learning pattern memory. If not, the calculation of block 330 is executed for the next pattern. If the number is of the last pattern, by contrast, block 350 decides whether all the patterns have satisfied the learning convergence conditions. If so, the calculation for learning is ended. If not, on the other hand, the process returns to block 320 for repeating the calculations from the first pattern.

In the first learning method, the weights are updated each time after pattern showing at block 330. For simplicity of the control method, this facilitates hardware realization. Also, a similar calculation is executed each time on a general-purpose computer, and therefore the computation efficiency is improved for supercomputers or the like in which computations are executed in vectorial fashion.

In spite of this, the problem of over-learning is still posed. The pattern convergence conditions are determined at block 350, and even a pattern satisfying the convergence conditions is updated in weights in accordance with the error at block 330. As a result, in the case where a small number of patterns are not converged, the error of the patterns that have already satisfied the convergence conditions tend to decrease further from the convergence conditions due to learning iterations. This decrease in the error with an unnecessarily high accuracy is called over-learning. It is a phenomenon, which once occurred, reduces the mean value of the error for the whole pattern but increases the error considerably beyond the mean value for a specific pattern, thereby delaying a general convergence. Further, the recognition rate of other learning patterns is deteriorated.

Figure 4:
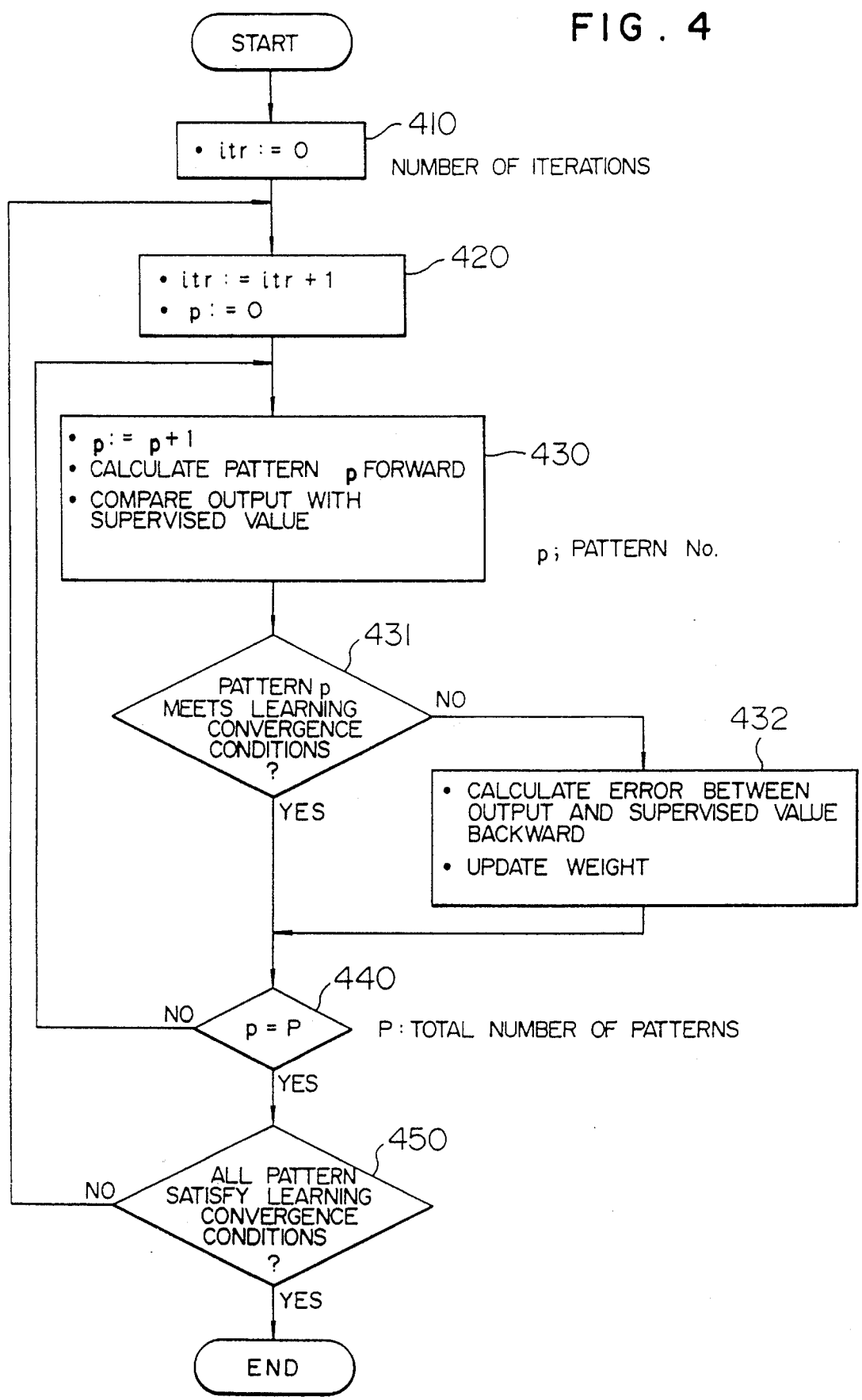
FIG. 4 is a diagram showing an example of a second learning method lacking a pattern showing control section.

FIG. 4 shows an example of a second learning method in general use which is effective for accelerating the learning while preventing the over-learning at the same time. The second learning method is for updating the weight from an error against a pattern that has failed to satisfy the learning conditions. As compared with FIG. 3, blocks 431 and 432 are added. The other blocks 410, 420, 430, 440 and 450 are similar to blocks 310, 320, 330, 340 and 350 respectively in FIG. 3. In other words, with regard to only the patterns that have yet to satisfy the convergence conditions, the weights are updated at the block 432. The block 432 is again executed also for the patterns that have already converged, only when they cease to satisfy the convergence conditions due to the weights updating of other patterns. As a result, the error is dispersed over the whole patterns. Also, the number of patterns not yet converged increases during the latter half as compared with the initial period of learning. More specifically, the increase in the number of cases in which the block 432 is not executed shortens the learning time generally.

Figure 5:
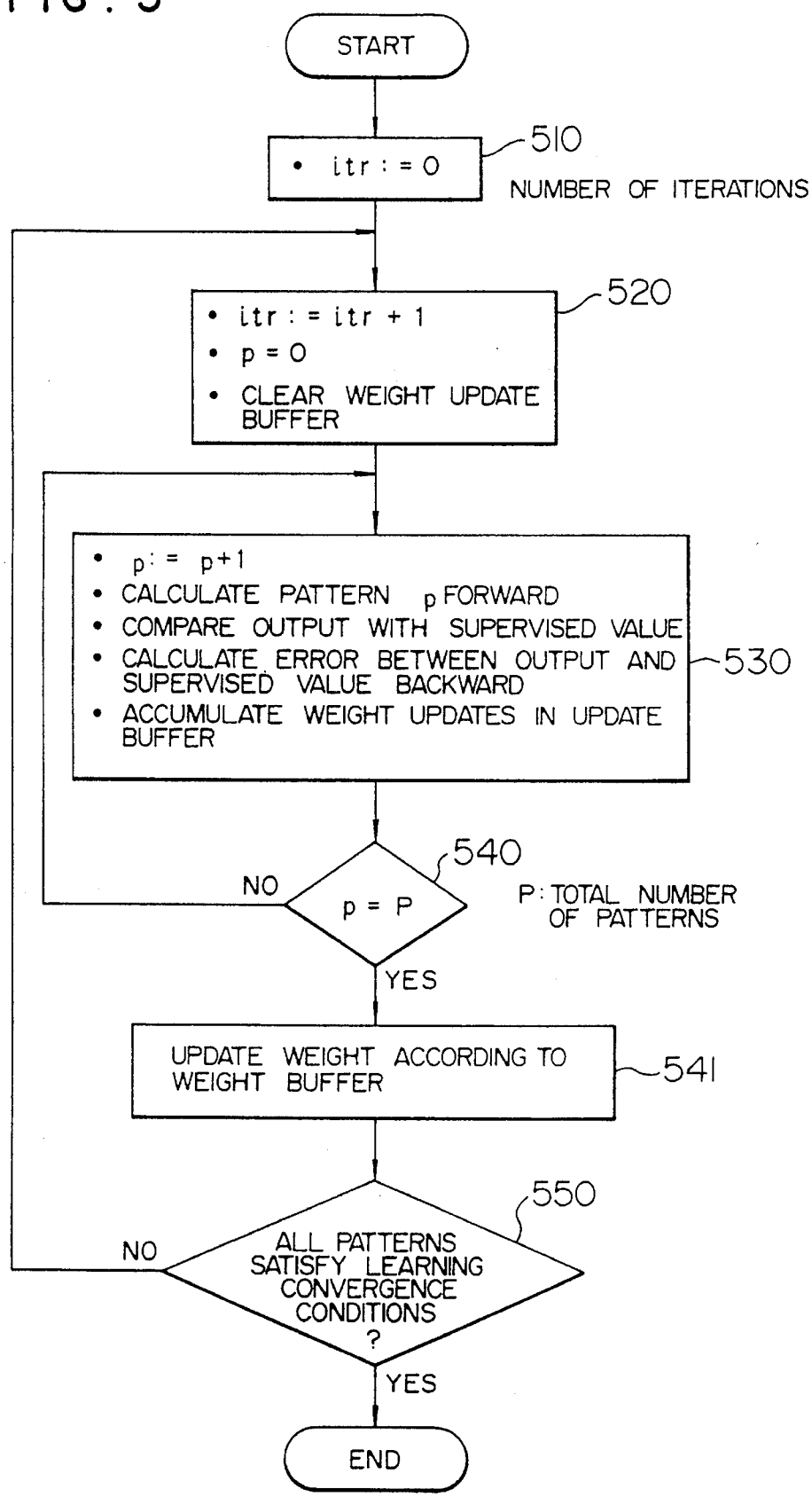
FIG. 5 is a diagram showing an example of a third learning method lacking a pattern showing control section.

FIG. 5 shows an example of a third learning method in general use. As compared with the method shown in FIG. 3, the block 530 (corresponding to means 330 in FIG. 3), instead of updating the weights, proceeds to add the weights update to an accumulating buffer, and updates the weights at a time point when patterns have been completely shown to the last. The accumulating buffer is initialized at block 520 in advance. In this way, execution of the weights updating after showing of all patterns not only eliminates the effect of the pattern showing sequence but also disperses the error due to the accumulation.

Figure 6:
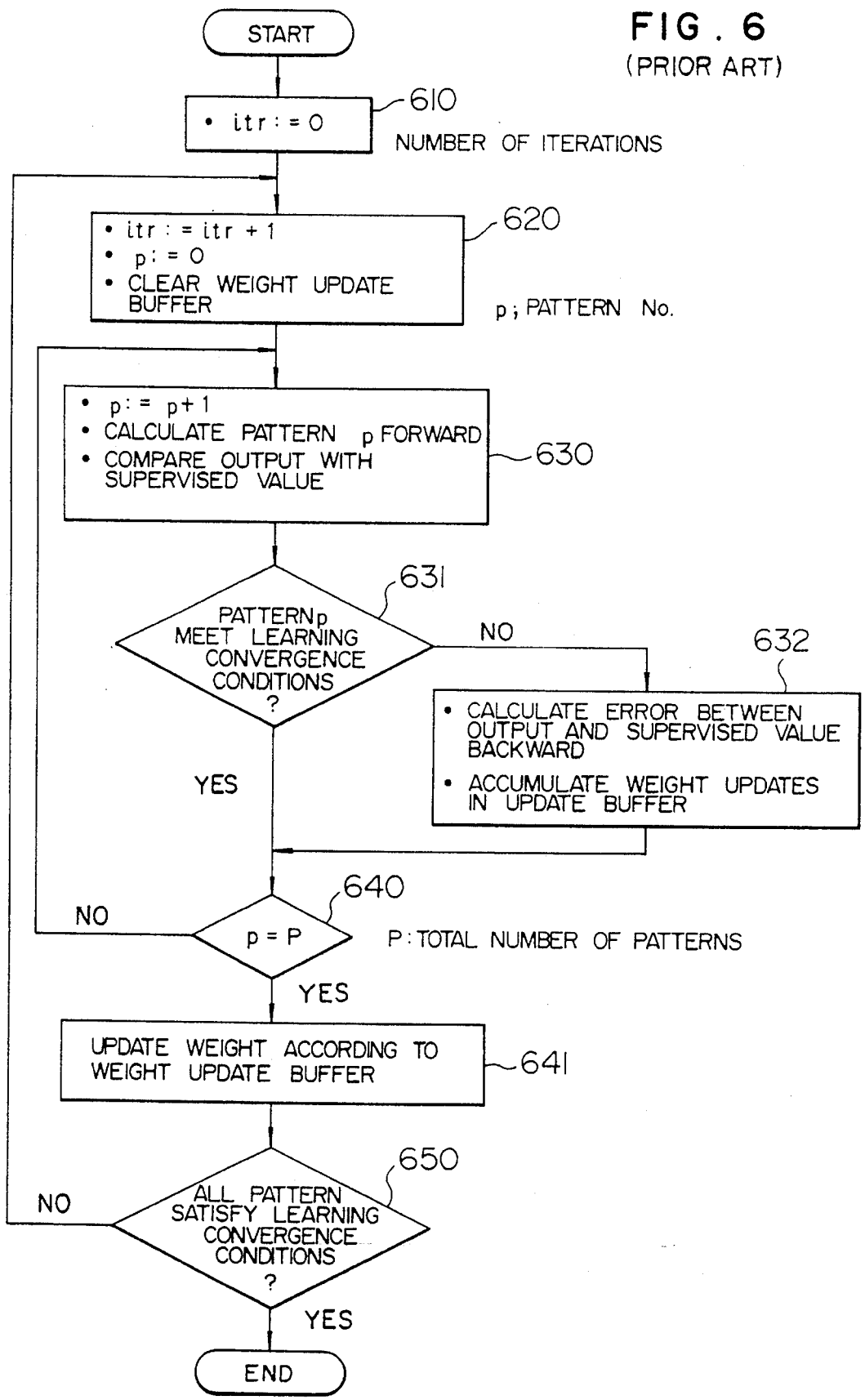
FIG. 6 is a diagram showing an example of a fourth learning method lacking a pattern showing control section.

FIG. 6 shows an example of fourth learning method generally used, and represents a combined technique of the aforementioned two methods (FIGS. 4 and 5). All of the methods are for learning a given pattern, and are incapable of ending the learning to the extent that an inconsistent pattern is mixed in the learning patterns.

Now, explanation will be made about a method of pattern showing used in the case where an inconsistent pattern exists due to a preparation error of a supervised pattern. There may also be a case in which a pair of input patterns, though not inconsistent, are very similar but the supervised patterns are quite different. These two types of pattern will not be distinguished from each other unless otherwise specified and will be called "the difficult-to-learn patterns" in the description that follows.

Figures 7, 8:
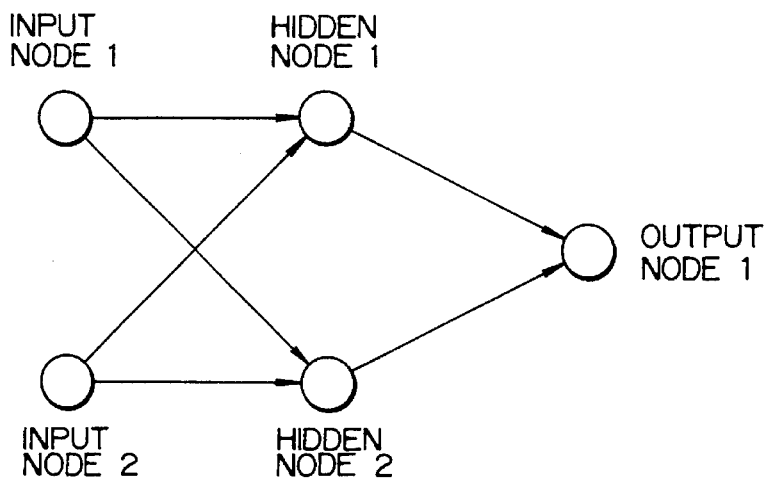
FIG. 7 is a diagram showing a network geometry used for solving an XOR problem.
FIG. 8 is a diagram showing an example of an input-output pattern containing a difficult-to-learn pattern.

A difficult-to-learn pattern will be explained taking an exclusive-or (XOR) as an example. FIG. 7 shows a network geometry used to deal with an XOR problem. The network structure is a three layer which include two input nodes (input node 1 and input node 2), a single hidden layer with two nodes, and an output layer with one node. The XOR problem is one in which a function for outputting an exclusive-or of two input values is approximated at a multilayer neural network. In the shown embodiment, the object of learning is to update the weights between nodes until an XOR value is outputted against four input patterns.

FIG. 8 shows four input-output patterns (1 to 4) and four difficult-to-learn patterns (5 to 8) as an example. With regard to the input patterns 1 to 4, the value of the exclusive-or between the input nodes 1 and 2 represents the value of the output node 1. If at least one of the patterns 5 to 8 is mixed with the patterns constituting the XOR of the input patterns 1 to 4, a difficult-to-learn pattern mixture results. In FIG. 8, the logic value is expressed by a decimal value. More specifically, the logic "0" represents 0.1, and logic "1" 1.0. In the case of back propagation, the learning is subjected to convergence calculation, and therefor it is impossible to produce an output in the form of 0.0 or 1.0. A convergence range is set and a complete convergence is assumed when this range is entered. Assuming that the convergence range is set to 0.1, for instance, the logic "0" represents the range of [−0.1, 0.1] and the logic "1" the range of [0.9, 1.1]. In the case where the value of only 1 or 0 is assumed as in logic calculations, the range may be set to about 0.4. In approximation of function, it is necessary to set the range in accordance with the required approximation precision.

Among the combinations of input-output patterns shown in FIG. 8, the pattern 5 is inconsistent with the pattern 1. An attempt to effect the learning of a total of five patterns from patterns 1 to 5, therefore, fails to end the learning due to the inconsistency between patterns 5 and 1. The patterns 6 and 1, though not inconsistent with each other, have the logics of output value inverted in spite of the great similarity of input patterns. The learning of the combinations of patterns 1, 2, 3, 4 and 6, though not impossible, requires a long learning time as compared with XOR learning. Patterns 7 and 8 have different similarities. A supervised pattern, when given by a human being, is liable to be in a value inconsistent with another supervised pattern. There is also a pattern difficult to classify such as seen in the problem of pattern recognition. In the case of printed character recognition, for example, there are cases in which one character (such as numerical character 1 (one)) is difficult to distinguish from another (English small letter l (el)) with a certain type of font.

Now, the effect of a difficult-to-learn pattern will be explained. FIG. 9 shows the number of learning iterations in five pattern combinations. The pattern combination 1 represents XOR and indicates the number of times (number of BPs) by which the network weights are updated for each pattern when the four patterns have converged. The method shown in FIG. 9 is used for pattern showing. This method is for back propagation of only the error of a pattern that has not satisfied the learning convergence conditions. As a result, the number of learnings is not equal for all the patterns. The pattern 1 converges with 17 learnings, and the pattern 2 with 20 learnings. Convergence occurs with a substantially, though not exactly, equal number of BPs. The combination 2 represents an XOR with the pattern 5 added thereto. Since patterns 1 and 5 contradict each other, no convergence occurs, with the process being ended with the number of limited iterations. No convergence is attained for combination 3 either, with the process ended with the number of limitations. The combination 3 also fails to converge, ending at the number of limitations. With the increase in the number of limitations, there is the possibility of convergence. The number of BPs for difficult-to-learn patterns, however, increases beyond the number of limitations. The combinations 4 and 5 have converged, although the number of BPs is seen to be more than for the combination 1. In this way, the existence of a difficult-to-learn pattern can be estimated from the number of BPs.

In this estimation, a decision is made after several learnings as to whether or not the number of BPs for a given pattern is greater than that for other patterns. Since the manner in which the learning proceeds is unknown, however, the time of decision cannot be set in advance. It is possible to remove difficult-to-learn patterns after sufficient learning, although it does not effectively shorten the learning time. It is therefore necessary to decide which patterns should be removed at what time in the process of learning.

Figures 10, 11:
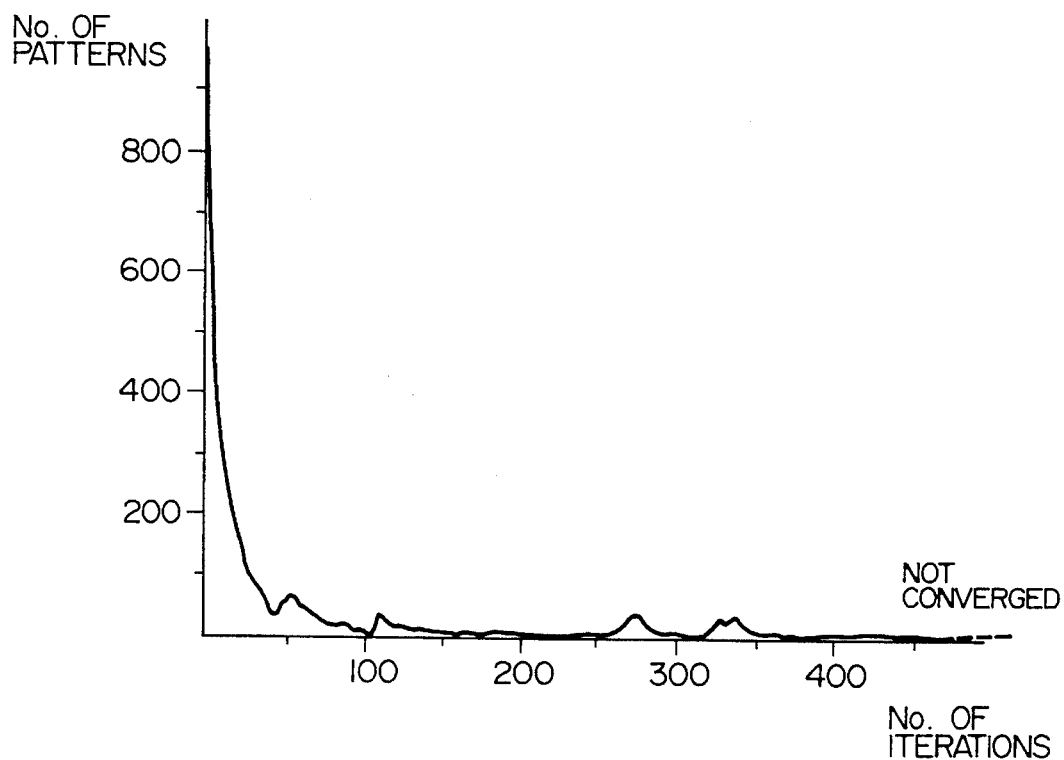
FIG. 10 is a diagram showing an example of learning process for hand-written numerals.
FIG. 11 is a diagram showing an example of the number of BPs for each pattern in the course of learning.
Figure 17:
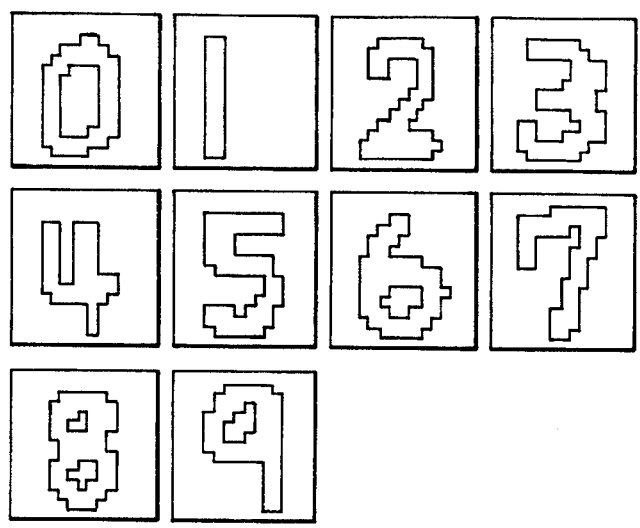
FIG. 17 is a diagram showing a typical example of hand-written numerals.

FIG. 10 shows an example of learning process in the case of hand-written numerals of 0, 1, ..., 9. This indicates the "itr" value in FIG. 4. The ordinate represents the number of patterns that have failed to satisfy the learning convergence conditions, which is equal to the number of patterns that have passed the block 432 in FIG. 4. The numerical pattern of the hand-written character used for learning is a gray image of 15×15. This pattern is obtained from a 64×64 binary image by adding a pixel value of the region 8×8 and shifting by four pixels each time. An example of this pattern is shown in FIG. 17. Although a total of 1382 learning patterns have substantially begun to complete the learning process through initial scores of learnings, the continuation of learning of a small number of patterns prevents the completion of learning process of the entire patterns even after 400 or more iterations. As seen from the graph of FIG. 10, the learning process can be accelerated if the patterns involving a large number of iterations can be removed. The network used in the embodiment under consideration is of a three-layer structure including 225 (15×15) nodes for the input layer, 128 nodes for the hidden layer and 10 nodes for the output layer (corresponding to the types of numerals), with all the nodes connected between the layers. More specifically, a node of the hidden layer is connected to all the nodes of the input layer, and a node of the output layer to all the nodes of the hidden layer.

FIG. 11 shows an example of the number of BPs for each pattern in the course of learning, together with the priority and removal flags. The priority flag designates non-removal even when the learning is difficult, while the removal flag is for designating the difficulty of learning and non-use for subsequent learning processes. Removal is indicated at 60 BPs for the pattern 4. For the pattern 3, however, the priority flag is set and therefore the removal flag is not set. In this way, the patterns for which the priority flag is set are not automatically removed, and therefore only competing patterns can be removed.

Figures 12, 13:
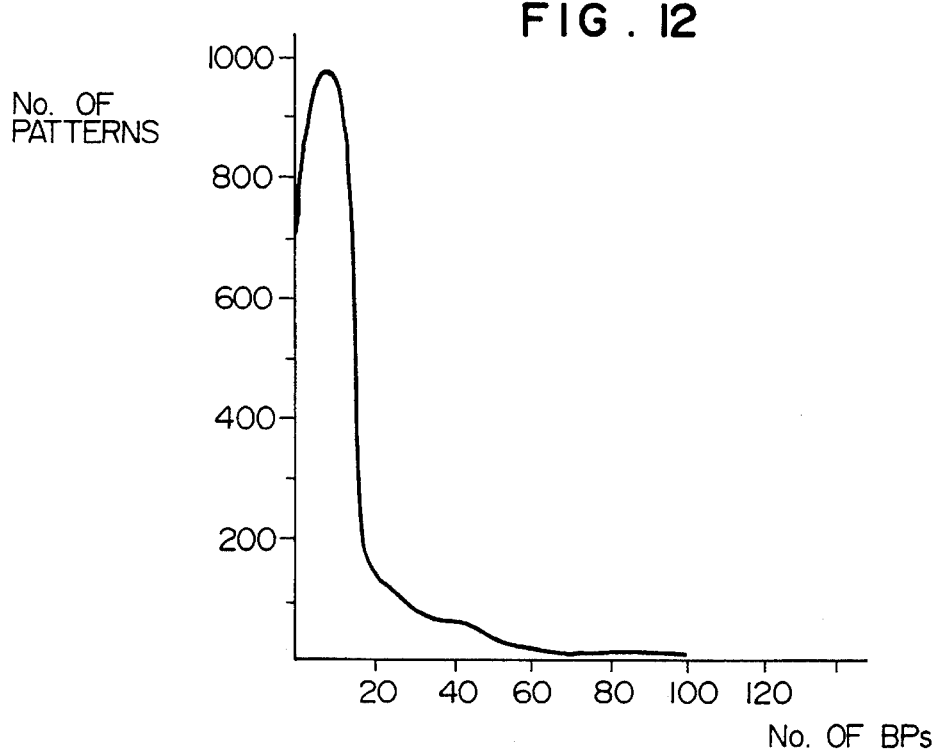
FIG. 12 is a diagram showing the relationship between the number of BPs and that of patterns failing to meet the conditions for ending the learning.
FIG. 13 is a diagram showing a histogram of the numbers of BPs and patterns.

FIG. 12 shows the number of patterns corresponding to the number of BPs as plotted on the abscissa. This represents a state involving 100 iterations of learning in FIG. 10. It will be seen that the number of BPs for most patterns is not more than about 60. The number of BPs providing a threshold is determined from the distribution style as shown in the drawing, and a pattern involving more than the particular number is determined as a difficult-to-learn pattern.

Now, explanation will be made about a method for determining a threshold value of the number of BPs used to decide on a difficult-to-learn pattern. FIG. 13 shows the graph of FIG. 12 rewritten into a table as a histogram with the number of BPs divided into units of ten. The mean value m of the number of BPs and the standard deviation σ determined from this are 16.4 and 12.6 respectively. If the value m+4σ is used as a threshold, for example, the number of BPs is 66.8. As a result, the pattern removed is a portion of the histogram No. 7 and the patterns Nos. 8, 9 and 10.

A flowchart for a method of removing difficult-to-learn patterns described above is shown in FIG. 14. The blocks included in this drawing correspond to the blocks 431, 432, 440 and 450 of the learning method described in FIG. 4.

In the case where the learning convergence conditions fail to be satisfied for the pattern p at block 1431, only the patterns failing to satisfy the convergence conditions are updated in weights by the block 1432. The block 1432 is executed also for the patterns that have been converged only when the convergence conditions have ceased to be satisfied for them by the weights updating for other patterns. Also, as a pretreatment for starting the learning process, the number of BPs is initialized (to zero) for each pattern, so that the number of BPs of the patterns determined not to satisfy the learning convergence conditions at block 1431 and for which the weights has been updated at block 1433 is incremented by one.

After iterations up to the last pattern at block 1440, the block 1441 decides whether or not the decision on pattern removal should be executed. It is for executing the removal decision after securing a statistical distribution to some degree of satisfaction that the learning iterations are limited to more than ITR. The statistical distribution means the distribution of the number of BPs for each pattern as shown in FIGS. 12 and 13. Block 1442 calculates the mean value m of the number of BPs and the standard deviation σ. Block 1443 repeats the calculation for all patterns, and block 1444 compares the number of pattern BPs with a threshold value. This threshold value can be set by parameter y. Only patterns having the number of BPs exceeding the threshold value and for which the priority flag is zero are removed, with the removal flag set to 1. Block 1450' decides whether all the patterns with zero removal flag meet the learning convergence conditions, and when the decision is affirmative, the learning is ended.

Figure 14:
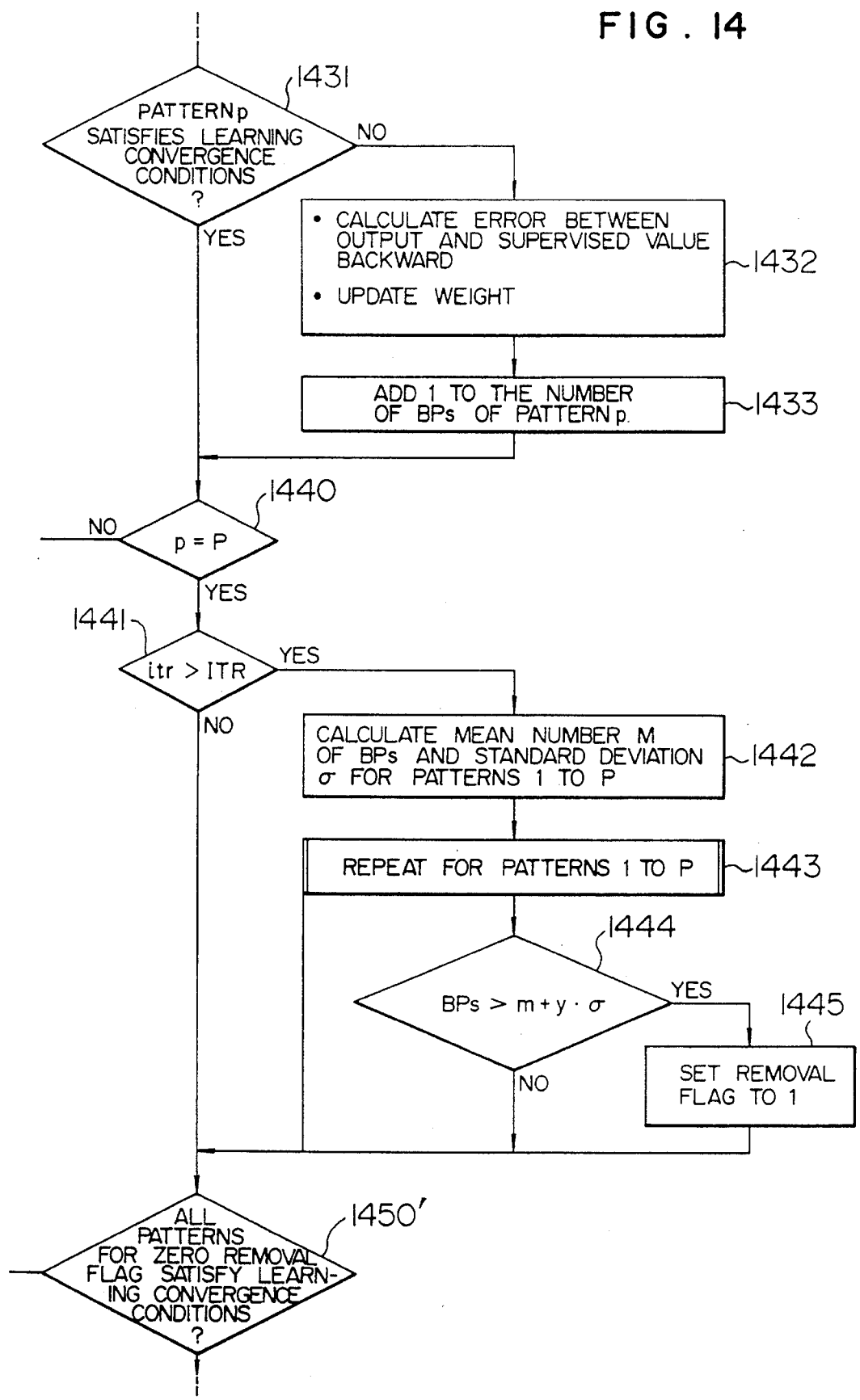
FIG. 14 is a general flowchart showing a method of eliminating difficult-to-learn patterns based on statistical distribution.
Figure 15:
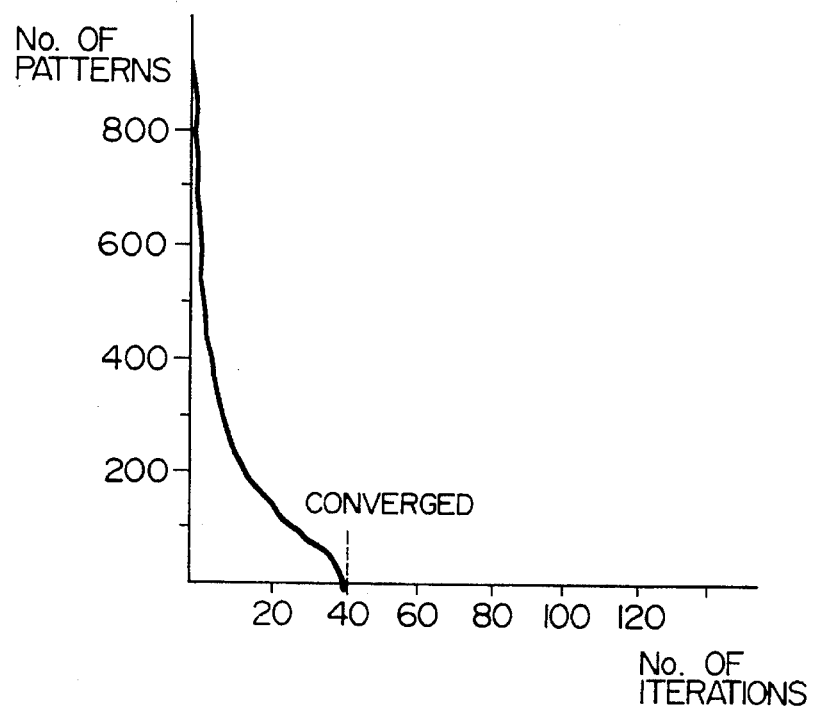
FIG. 15 is a diagram showing a first example of learning process in which difficult-to-learn patterns are eliminated.
Figure 16:
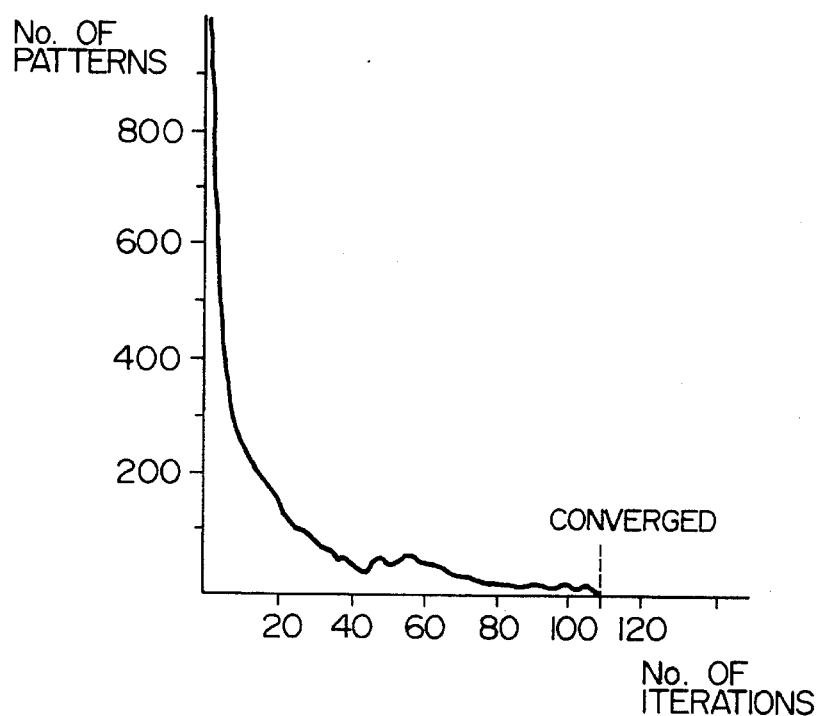
FIG. 16 is a diagram showing a second example of learning process in which difficult-to-learn patterns are eliminated.

FIGS. 15 and 16 show the number of patterns that have failed to satisfy the learning ending conditions against the number of learning iterations with the threshold value parameter y of block 1444 in FIG. 14 set to 3 and 5 respectively. The learning is ended at 40 iterations in FIG. 15 and at about 110 iterations in FIG. 16. As compared with the case where no convergence occurs even after 400 learning iterations (FIG. 10), the effect of removal of difficult-to-learn patterns will be understood.

Figure 18:
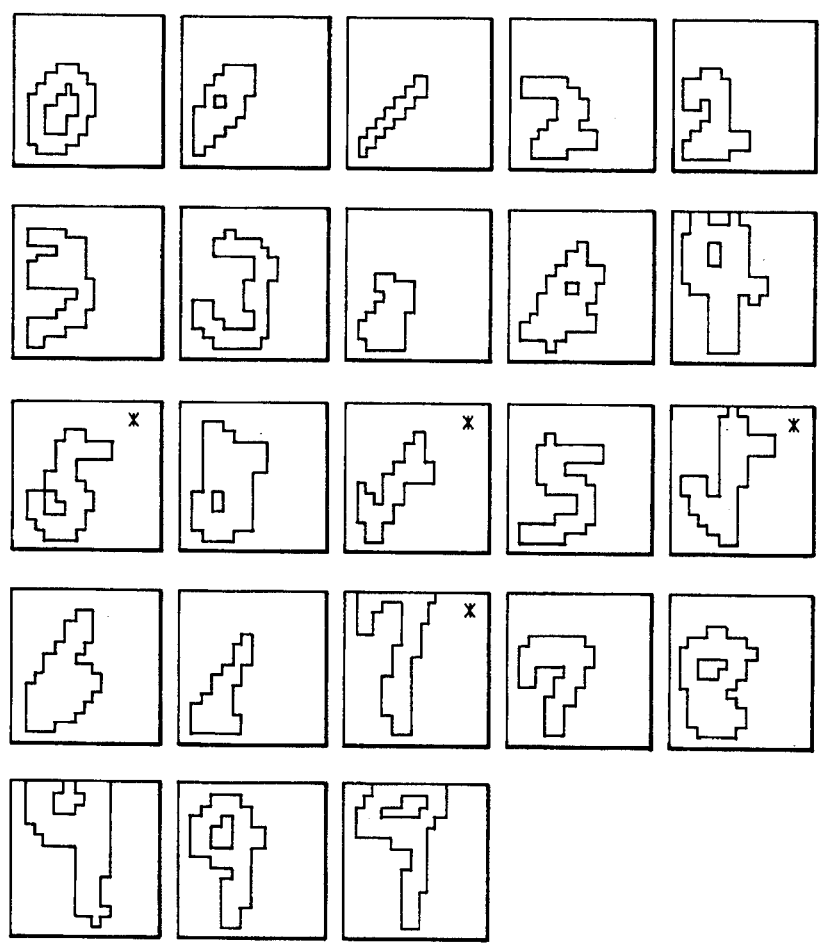
FIG. 18 is a diagram showing an example of hand-written numerals eliminated as a difficult-to-learn pattern.

FIG. 18 shows an .example of hand-written patterns removed as difficult to learn. The 23 patterns shown are removed under the conditions specified in FIG. 15. The four patterns indicated by * at the upper right portion correspond to the conditions specified in FIG. 16. In this learning, no priority flag is set. As will be seen from the drawing, these patterns are characterized by a considerable distortion or similarity to other numerals. A difficult-to-learn pattern as referred to in the present specification means a pattern which is difficult to learn if used in a given neural network. In the case where a network which recognizes only a removed pattern is provided separately, it may be that the learning is completed. Even in such a case, the pattern removal remains valid.

Figure 19:
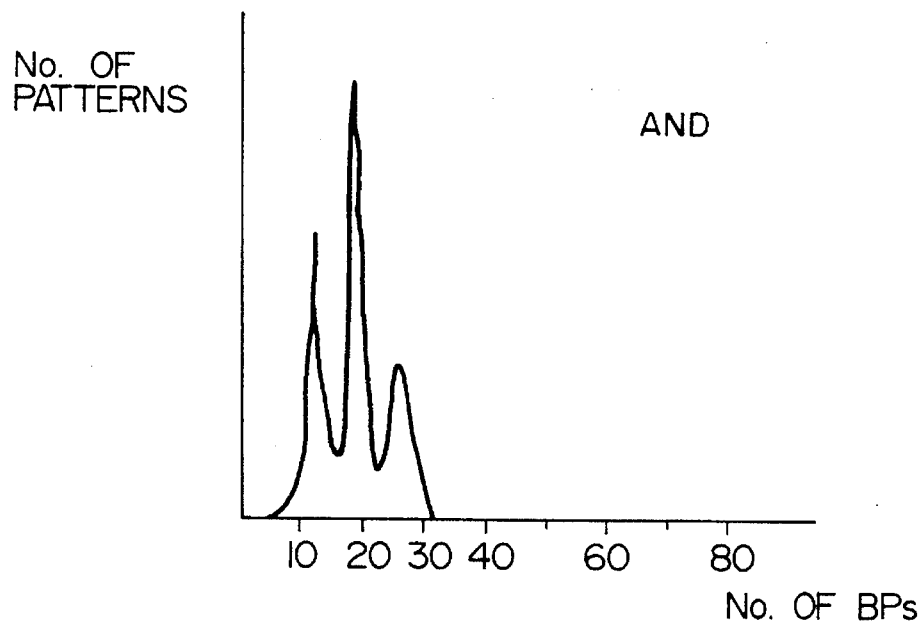
FIG. 19 is a first diagram showing the relationship between the number of BPs and the number of patterns that have failed to satisfy the conditions for ending the learning.
Figure 20:
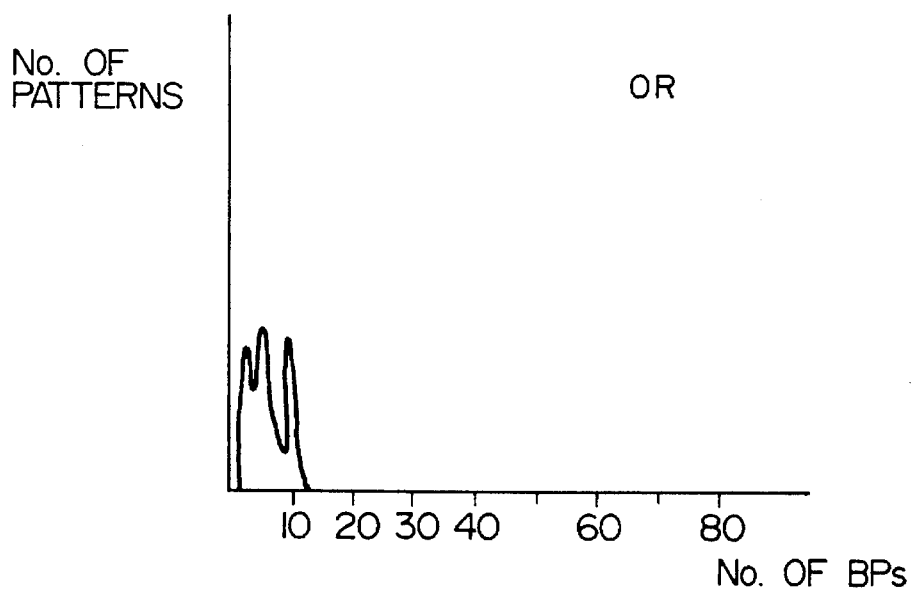
FIG. 20 is a second diagram showing the relationship between the number of BPs and the number of patterns that have failed to satisfy the conditions for ending the learning.
Figure 21:
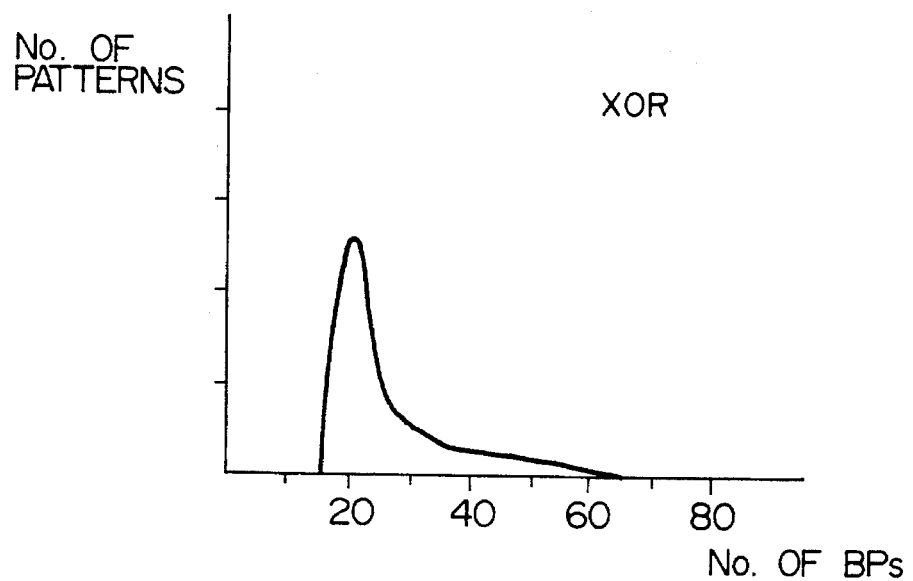
FIG. 21 is a third diagram showing the relationship between the number of BPs and the number of patterns that have failed to satisfy the conditions for ending the learning.
Figure 22:
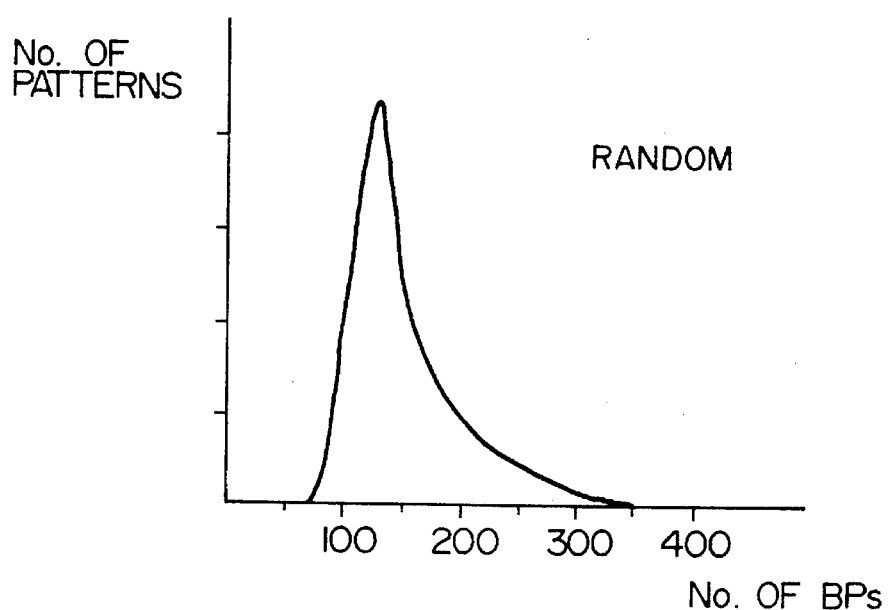
FIG. 22 is a fourth diagram showing the relationship between the number of BPs and the number of patterns that have failed to satisfy the conditions for ending the learning.

The method of removing difficult-to-learn patterns described above depends on the statistical distribution of the number of BPs. FIGS. 19 to 20 show statistical distributions against learning patterns of other than hand-written characters. These graphs all concern the case of the learning completed. Similar statistical characteristics are seen with a peak for a small number of BPs and a small number of patterns for a large number of BPs. FIG. 19 shows the case concerning the problem of a logic product AND. There are a total of four patterns in this case, and a statistical distribution for a large number of patterns is estimated by executing a plurality of learnings. FIG. 20 refers to the problem of logic sum OR, in which case there are a total of four patterns and a statistical distribution is estimated with a large number of patterns by executing a plurality of learnings. FIG. 21 shows the case involving the problem of exclusive logic sum XOR, in which case there are a total of four patterns and a plurality of learnings are executed thereby to estimate a statistical distribution with a large number of patterns. FIG. 22 is a graph representing a case with an input-output pattern of 20 vectors each having 5 elements using a network of five input nodes, 20 nodes for the hidden layer and five output nodes. These 20 vectors with 10 elements (200 elements altogether) are generated from uniform random values in the section [0, 1].

In addition to the removal decision based on a statistical distribution of the number of BPs for each pattern, removal may be decided from the learning history. According to the method based on a statistical distribution, it is impossible to determine the degree of change in learned patterns before and after learning iterations (itr, itr+1) for deciding by the number of learning iterations. The back propagation learning algorithm has the feature that the learning continues for a difficult-to-learn pattern. This feature is effectively utilized by the decision from the learning history (along time axis).

Figure 23:
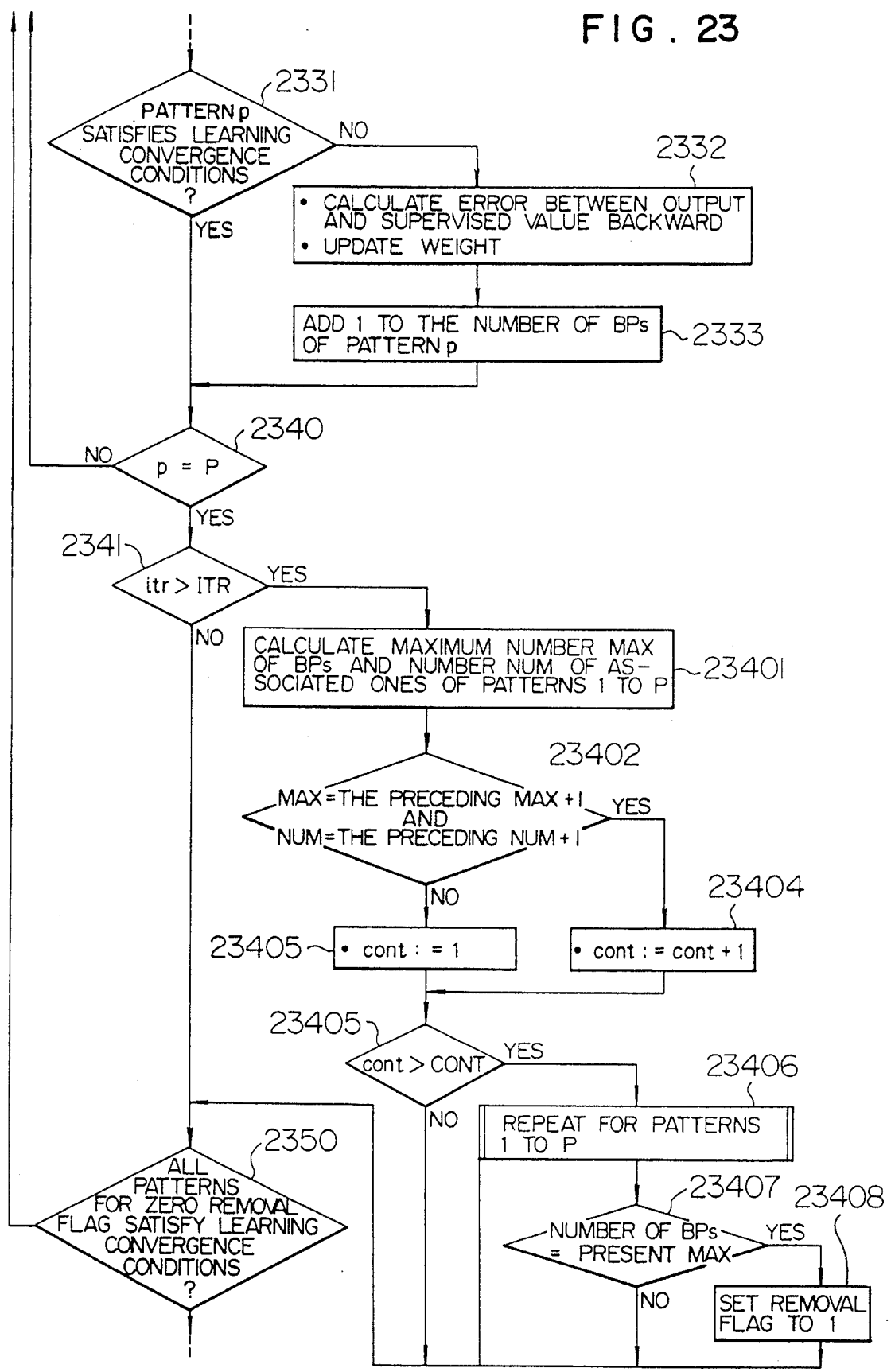
FIG. 23 is a general flowchart showing a method of removing difficult-to-learn patterns based on the learning history.

A method of this decision is shown in FIG. 23. Blocks 1442 to 1445 in the method of removal shown in FIG. 14 correspond to blocks 23401 to 23408 respectively in FIG. 23.

Block 23401 executes the learning up to the pattern P and determines the maximum value MAX of the number of BPs for each pattern. There may be a plurality of patterns having the value MAX, and therefore the number of patterns NUM is also determined. When block 23402 decides that the maximum value MAX is larger than the preceding MAX of learning iterations by one and NUM remains equal, the process branches to block 23404. This decision is based on the fact that the number of BPs is generally large and the learning continues for a pattern likely be to difficult to learn. The calculation efficiency is high since no calculations are required for other than MAX and NUM. Also, in view of the fact that the number of BPs for difficult-to-learn patterns belonging to the categories competing with each other is substantially equal to each other and that such patterns are replaced with each other for execution of learning, the decision method of block 23402 is seen to be simple and effective. More specifically, unlike in the method based on the statistical distribution which removes all competing patterns, the method using the learning history is capable of removing only the patterns in different categories. In order to determine the number of conditions continued under block 23402, block 23404 increments CONT by one. In the case where the conditions fail to be satisfied, block 23404 initializes CONT to 1. If the number of continuations CONT exceeds the threshold value (CONT), block 23406 is executed, followed by block 23407 for deciding on a pattern involved and block 23408 for setting a removal flag. When the threshold value (CONT) is small, removal easily occurs, and vice versa. When the value (CONT) is small, it is associated with a small parameter y in the block 1444 according to the method based on the statistical distribution described with reference to FIG. 14.

Also in the case where learning patterns making up sets of input and supervised patterns contain inconsistent or difficult-to-learn patterns, it is possible to end the learning by removing such patterns during the calculation of learning iterations, thus realizing an accelerated learning process. The patterns thus removed are positively decided to be unique learning patterns.

Further, the update time can be saved for an accelerated learning by updating the weight without fail not after the showing of an input pattern but only when the difference with a supervised pattern is less than the threshold value. This limitation prevents over-learning since approximation with further precision is avoided for a pattern that has already satisfied the learning convergence conditions.

If a priority flag is used for designating a certain pattern which must be used without fail for adjusting the weights, it is possible to conduct the learning of selected ones of competing difficult-to-learn patterns.

In the back propagation learning method, the number of pattern learnings, i.e., the numeral indicating the number of times by which a given pattern is used for weight adjustment, tends to increase. Therefore, whether a learning is difficult or not can be determined from the history of the number of learnings.

We claim:

1. A multilayer neural network learning system comprising:

an input layer including input means for inputting a plurality of input patterns, a hidden layer including a first plurality of data processing means, and an output layer including a second plurality of data processing means having means for outputting an output pattern;

wherein said hidden layer and said output layer have memory means connected to said input layer and the first plurality of data processing means of the hidden layer belonging to a low layer nearer to the input layer for storing weights corresponding to respective connections, said first plurality of data processing means conducting sum-of-products computation based on the weights;

said system further comprising:

neural network means for conducting steps of learning by use of back propagation;

learning history memory means for storing a difference between a set comprising an output pattern computed from a given one of the input patterns and a supervised pattern constituting a desirable output pattern at each time of weight adjustment and a number of times of weight adjustment for the set; and pattern showing control means for determining and eliminating the set of said input pattern and said supervised pattern from weight adjustment if said difference between said input pattern and said supervised pattern indicates a failure to satisfy learning convergence conditions after the weight adjustment for said set are performed more than a predetermined number of times.

2. The neural network learning system according to claim 1, wherein said neural network means adjusts the weights of the first and second data processing means of said hidden and output layers in such a manner that when a given one of the input patterns is inputted from the input layer, a pattern substantially equal to an output pattern corresponding to said input pattern is outputted from said output layer, said weight adjustment being repeated at times less than or equal to a predetermined maximum times until patterns substantially equal to output patterns corresponding to all the input patterns are outputted from said output layer, said system thus using back propagation.

3. The neural network learning system according to claim 1, wherein said pattern showing control means includes a priority flag designating that weights are always adjusted.

4. The neural network learning system according to claim 1, wherein said pattern showing control means includes means for determining whether a given pattern should be used for weight adjustment in subsequent learning calculations on a basis of a statistical distribution of the number of weight adjustments produced from said learning history control means.

5. The neural network learning system according to claim 1, wherein said learning history control means includes means for storing a change in the number of weight adjustments for each learning iteration.

6. A multilayer neural network learning system comprising:

an input layer including means for inputting a plurality of input patterns, at least a hidden layer including a first plurality of data processing means and an output layer including a second plurality of data processing means having means for outputting an output pattern;

wherein said first and second data processing means of said hidden and output layers include memory means connected to said input layer and said hidden layer belonging to a low layer nearer to said input layer for storing weights corresponding to said respective connections, said data processing means conducting a sum-of-products computation according to said weights;

said system further comprising neural network means for adjusting the weights of the first and second data processing means of said hidden and output layers in such a manner that when a given one of a plurality of input patterns among a plurality of sets of input and output patterns is inputted from the input layer, a pattern substantially equal to an output pattern corresponding to said input pattern is outputted from said output layer, said weight adjustment being repeated until patterns substantially equal, to the output patterns corresponding to all the input patterns are outputted from said output layer, thereby conducting the learning by back propagation;

said system further comprising;
means for storing said input patterns,
means for storing said output patterns,
means for storing a supervised pattern providing a desirable output pattern,
means for comparing an output pattern calculated from a given input pattern for each weight adjustment with said supervised pattern,
learning history memory means for storing a result of the comparing, pattern showing control means for determining and eliminating a set of said input pattern and said supervised pattern from adjustments of weight if said difference between said input pattern and said supervised pattern indicates a failure to satisfy learning convergence conditions after the adjustments of weight for said set are performed more than a predetermined number of times; and means for calculating the weight according to said difference.

7. A recognition system using a neural network, comprising:

input means for inputting a pattern;

means for storing input patterns;

means for storing output patterns;

means for storing a supervised pattern providing a desirable output pattern;

multilayer neural network means for adjusting a weight in such a manner that each pattern among a plurality of sets of input and supervised patterns is substantially equal to a corresponding supervised pattern, said weight adjustment being repeated until output patterns substantially equal to supervised patterns corresponding to all input patterns are outputted; and neural network learning control means for storing results and times of comparison between the output pattern calculated from each pattern for each weight adjustment and said supervised pattern, and for determining and eliminating a set of said input pattern and said supervised patterns from adjustments of weight if said results of comparison between said input pattern and said supervised pattern are equal to or more than a predetermined value in case that said times of comparison are more than a predetermined number of times, and calculating the weight according to said determining.

8. A method for learning patterns by a multilayer neural network, wherein when a given input pattern among a plurality of sets of input patterns and supervised patterns is inputted, a weight is adjusted in such a manner that an output pattern becomes substantially equal to a supervised pattern corresponding to the particular input pattern, said weight adjustment being repeated until output patterns substantially equal to the supervised patterns corresponding to all the inputs are outputted, comprising the steps of:

comparing an output pattern corresponding to a given input pattern with said supervised pattern for each weight adjustment; and determining that a specific set of input and supervised patterns are not to be used for weight adjustment if said comparing has a result that is equal to or more than a predetermined threshold value representative that weight adjustments are performed more than a predetermined number of times.

9. The method for learning patterns for a neural network according to claim 8, further comprising the step of designating a specific one of a plurality of sets of input and supervised patterns which is used for weight adjustment.

10. The method for learning patterns for a neural network according to claim 8, further comprising the step of storing the number of times that the input and supervised patterns have been used for weight adjustment.

11. The method for learning patterns for a neural network according to claim 10, further comprising the step of determining whether some patterns out of given patterns should be used for weight adjustment in subsequent learning calculations on a basis of a statistical distribution of the number of times of the weight adjustments.

12. The method for learning patterns for a neural network according to claim 10, further comprising the step of storing a change in the number of weight adjustments for each learning iteration.

13. The method for learning patterns for a neural network according to claim 12, further comprising the step of determining whether some patterns out of given patterns should be used for weight adjustment after a predetermined number of learning iterations.

* * * * *